United States Patent
Tokozakura et al.

(10) Patent No.: US 9,957,879 B2
(45) Date of Patent: May 1, 2018

(54) HEAT EXCHANGER FOR VEHICLE

(71) Applicant: TOYOTA JIDOSHA KABUSHIKI KAISHA, Toyota-shi (JP)

(72) Inventors: Daisuke Tokozakura, Susono (JP); Kazuya Arakawa, Fujinomiya (JP); Takahiro Shiina, Numazu (JP)

(73) Assignee: TOYOTA JIDOSHI KABUSHIKI KAISHA, Toyota-shi (JP)

( * ) Notice: Subject to any disclaimer, the term of this patent is extended or adjusted under 35 U.S.C. 154(b) by 135 days.

(21) Appl. No.: 15/218,572

(22) Filed: Jul. 25, 2016

(65) Prior Publication Data

US 2017/0030254 A1 Feb. 2, 2017

(30) Foreign Application Priority Data

Jul. 28, 2015 (JP) .................. 2015-148253

(51) Int. Cl.
*F01P 11/08* (2006.01)
*F28D 9/00* (2006.01)
*F16H 57/04* (2010.01)

(52) U.S. Cl.
CPC .......... *F01P 11/08* (2013.01); *F16H 57/0417* (2013.01); *F28D 9/0093* (2013.01)

(58) Field of Classification Search
CPC ... F01P 11/08; F01P 11/16; F01P 11/18; F01P 11/04; F01P 11/00; F01P 7/14; F16H 57/0417; F16H 57/0401; F16H 57/0412; F16H 57/0413; F16H 57/0415; F16H 57/0416; F16H 57/042; F28D 9/0093; F28D 1/03; F28D 1/0308; F28D 1/0316; F28D 1/0325; F28D 1/0333; F28D 1/0341; F28D 1/035; F28D 9/00; F28D 9/0006; F28D 9/0031; F28D 9/0037; F28D 9/0056
USPC ......... 123/41.31, 41.01, 41.33, 41.05, 41.13, 123/41.71, 41.14, 41.54; 165/140, 164,
(Continued)

(56) References Cited

U.S. PATENT DOCUMENTS 5,896,834 A * 4/1999 Gruner .................... F28D 9/005
  123/196 AB
5,964,280 A * 10/1999 Wehrmann ............... F28D 9/005
  165/140

(Continued)

FOREIGN PATENT DOCUMENTS

JP  2013-113578 A   6/2013
JP  2013-120054 A   6/2013

*Primary Examiner* — Thomas Moulis
*Assistant Examiner* — John Bailey
(74) *Attorney, Agent, or Firm* — Oblon, McClelland, Maier & Neustadt, L.L.P.

(57) ABSTRACT

A heat exchanger includes: a first flow passage for an engine coolant; a second flow passage for an engine oil; a third flow passage for a transmission oil; and plural plates that partition the first, the second and the third flow passage. The first flow passage is configured to allow the engine coolant to be heat-exchanged with both the engine oil and the transmission oil via the plates. The second flow passage is arranged in the same layer with the third flow passage. The first flow passage is arranged in a different layer from the layer of the second and the third flow passage. The third flow passage is disposed on an upstream side and second flow passage is disposed on a downstream side in a flow direction of the engine coolant in the first flow passage.

4 Claims, 6 Drawing Sheets

(58) Field of Classification Search
USPC ....... 165/165, 157, 166, 125, 71; 184/104.1, 184/104.3, 6.22; 474/93
See application file for complete search history.

(56) References Cited

U.S. PATENT DOCUMENTS

| | | | | |
|---|---|---|---|---|
| 8,752,522 | B1* | 6/2014 | Cohen | F01P 3/18 123/195 A |
| 9,316,448 | B2* | 4/2016 | Kanzaka | F28D 9/005 |
| 9,581,367 | B2* | 2/2017 | Mann | F25B 39/00 |
| 9,856,778 | B2* | 1/2018 | Tokozakura | F01P 11/08 |
| 2005/0205236 | A1* | 9/2005 | Kalbacher | F01M 5/002 165/11.1 |
| 2006/0113068 | A1* | 6/2006 | Desai | F28D 1/0417 165/140 |
| 2010/0012054 | A1* | 1/2010 | Justin | F01P 3/18 123/41.1 |
| 2013/0133874 | A1* | 5/2013 | Kim | F01P 3/18 165/296 |
| 2013/0133875 | A1* | 5/2013 | Kim | F28F 27/02 165/296 |
| 2013/0140017 | A1* | 6/2013 | Kim | F28F 27/02 165/299 |
| 2014/0150739 | A1* | 6/2014 | Kim | F01P 7/165 123/41.33 |
| 2015/0101781 | A1* | 4/2015 | Kim | F01P 3/12 165/96 |
| 2015/0369115 | A1* | 12/2015 | Kim | F28F 27/02 123/41.33 |
| 2016/0215664 | A1* | 7/2016 | Boyer | F01M 5/005 |
| 2016/0363399 | A1* | 12/2016 | Kim | F16K 31/002 |
| 2017/0030253 | A1* | 2/2017 | Tokozakura | F01P 11/08 |
| 2017/0030255 | A1* | 2/2017 | Tokozakura | F01P 11/08 |

* cited by examiner

and disposed on a downstream side in the flow

HEAT EXCHANGER FOR VEHICLE

INCORPORATION BY REFERENCE

The disclosure of Japanese Patent Application No. 2015-148253 filed on 5 Jul. 28, 2015 including the specification, drawings and abstract is incorporated herein by reference in its entirety.

BACKGROUND

1. Technical Field

The present disclosure relates to a heat exchanger for a vehicle.

2. Description of Related Art

There have been known heat exchangers that are installed in vehicles, and heat-exchange engine coolants with engine oils and with transmission oils so as to adjust temperatures of these oils. Japanese Patent Application Publication No. 2013-113578 discloses a vehicle heat exchanger that includes stacked flow passages through which an engine coolant, an engine oil, and a transmission oil respectively flow, and allows the these fluids to be heat-exchanged with one another. In this vehicle heat exchanger, heat exchange is carried out between the engine coolant and the engine oil, and heat exchange is also carried out between the engine coolant and the transmission oil.

In the vehicle heat exchanger disclosed in JP 2013-113578 A, each flow passage through which the engine oil flows and each flow passage through which the transmission oil flows are arranged in a manner as to interpose each flow passage of the engine coolant therebetween, and thus the engine coolant is heat-exchanged with the engine oil and with the transmission oil in parallel. In other words, the engine coolant is simultaneously heat-exchanged with the engine oil and with the transmission oil.

SUMMARY

In general, a transmission oil has a greater degree of variation in loss relative to variation in oil temperature than that of an engine oil. The degree of variation in loss denotes a degree of loss torque of an engine and a transmission when each oil temperature varies by 1° C., for example. Hence, if both the engine oil and the transmission oil are heat-exchanged with the engine coolant in parallel, both the engine oil and the transmission oil experience variation in loss in accordance with variation in each oil temperature. In light of improvement of fuel efficiency, there is room for improving the above configuration.

The present disclosure provides a heat exchanger for a vehicle capable of enhancing fuel efficiency of an entire power train.

An example aspect of the disclosure provides a heat exchanger for a vehicle. The vehicle includes an engine and a transmission. The heat exchanger includes: a first flow passage through which an engine coolant flows; a second flow passage through which an engine oil flows; a third flow passage through which a transmission oil flows; and plural plates that partition the first flow passage, the second flow passage, and the third flow passage. The first flow passage is configured to allow the engine coolant to be heat-exchanged with both the engine oil in the second flow passage and the transmission oil in the third flow passage via the plates. The second flow passage is arranged in the same layer as a layer of the third flow passage. The first flow passage is arranged in a different layer from the layer of the second flow passage and the third flow passage. The third flow passage is disposed on an upstream side in a flow direction of the engine coolant in the first flow passage. The second flow passage is disposed on a downstream side in the flow direction of the engine coolant in the first flow passage.

With the configuration, the heat exchanger first heat-exchanges the engine coolant with the transmission oil. Subsequently, the heat exchanger heat-exchanges the engine coolant with the engine oil, thereby preferentially heat-exchanging the transmission oil having a greater variation in loss relative to variation in oil temperature with the other fluids (the engine coolant and the engine oil). Accordingly, for example, during the transmission warming-up, it is possible to rapidly increase the temperature of the transmission oil, thus reducing loss of the transmission, and enhancing the fuel efficiency of the entire power train.

In the heat exchanger for the vehicle, the first flow passage may have a first inflow port of the engine coolant and a first outflow port of the engine coolant. The second flow passage may have a second inflow port of the engine oil and a second outflow port of the engine oil. The first inflow port, the first outflow port, the second inflow port and the second outflow port may be arranged in such a manner that a flow direction of the engine coolant in the first flow passage and a flow direction of the engine oil in the second flow passage are in counter-flow relative to each other.

With this configuration, in the heat exchanger, the flow direction of the engine coolant and the flow direction of the engine oil are in counter-flow relative to each other, and thus it is possible to maintain the difference in temperature between the respective fluids partitioned by the plates to be great, compared with the case of being in co-flow, thereby efficiently carrying out the heat exchange between the engine coolant and the engine oil.

In the heat exchanger for the vehicle, the first flow passage may have a first inflow port of the engine coolant and a first outflow port of the engine coolant. The third flow passage may have a third inflow port of the transmission oil and a third outflow port of the transmission oil. The first inflow port, the first outflow port, the third inflow port and the third outflow port may be arranged in such a manner that a flow direction of the engine coolant in the first flow passage and a flow direction of the transmission oil in the third flow passage are in counter-flow relative to each other.

With this configuration, in the heat exchanger, the flow direction of the engine coolant and the flow direction of the transmission oil are in counter-flow relative to each other, and thus it is possible to maintain the difference in temperature between the respective fluids partitioned by the plates to be great, compared with the case of being in co-flow, thereby efficiently carrying out the heat exchange between the engine coolant and the transmission oil.

In the heat exchanger for the vehicle, a third area of the third flow passage in the direction orthogonal to a stacking direction of the plates may be greater than a second area of the second flow passage in a direction orthogonal to the stacking direction of the plates.

With this configuration, in the heat exchanger, one of the engine oil and the transmission oil that has a lower oil temperature before the completion of the warming-up has an increased flow rate, thereby increasing the amount of heat exchange.

With the above-mentioned configuration, in the heat exchanger, one of the engine oil and the transmission oil that has a higher oil temperature during high-speed drive or high-load drive has an increased flow rate, thereby increasing the amount of heat exchange.

According to the heat exchanger of the present disclosure, the respective flow passages are arranged in consideration of variation in loss relative to variation in each oil temperature of the engine oil and the transmission oil, thereby optimizing the respective amounts of heat exchange of the engine coolant, the engine oil, and the transmission oil; therefore, it is possible to reduce loss of the engine and the transmission, and enhance fuel efficiency of the entire power train.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A heat exchanger for a vehicle according to each embodiment will be described with reference to FIG. 1 to FIG. 10. The embodiments are not limited to only embodiments described below. Configuration elements in the following embodiments include those easy and replaceable by a person skilled in the art, or substantially the same.

Figure 1A:
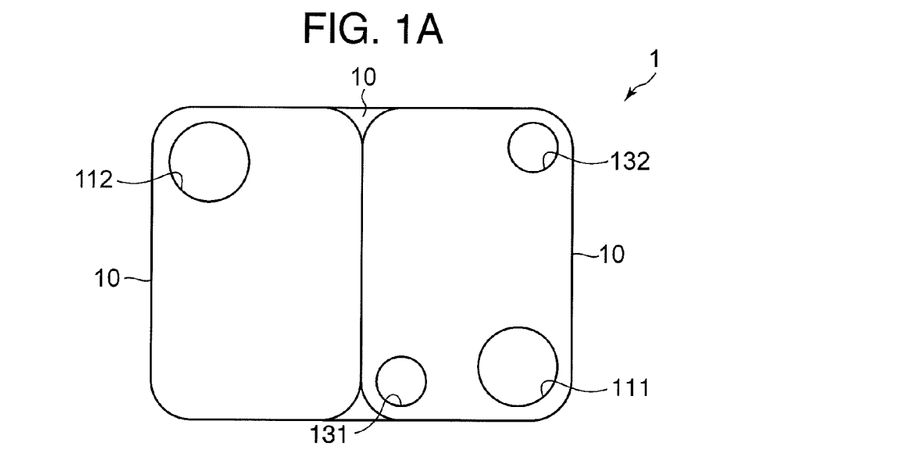
FIGS. 1A, 1B, and 1C are schematic drawings schematically illustrating a configuration of a heat exchanger according to a first embodiment, and showing a plan view (FIG. 1A), a front view (FIG. 1B), and a bottom view (FIG. 1C) thereof in order from the top.
Figure 1B:
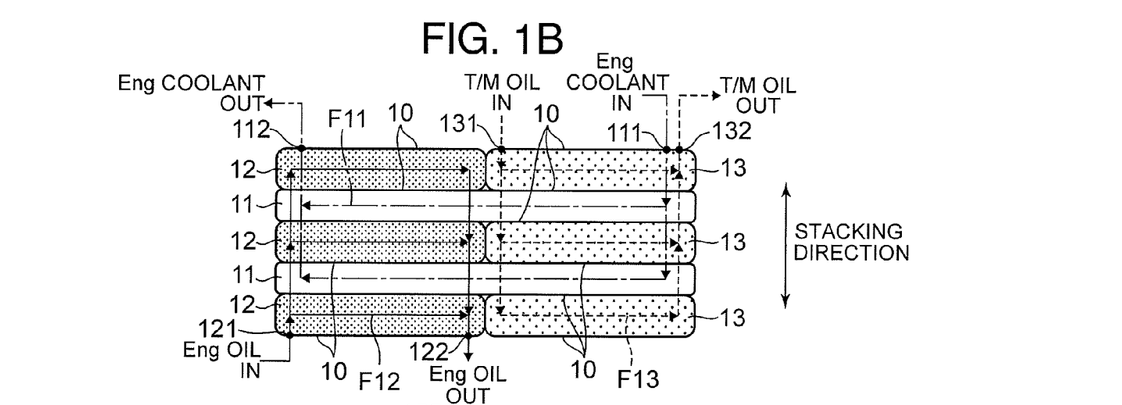
Figure 1C:
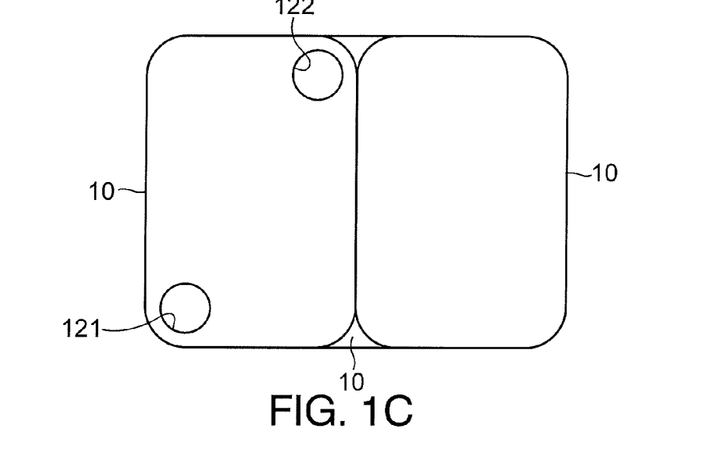

The heat exchanger 1 according to the first embodiment is a so-called three-phase heat exchanger that is installed in a vehicle, and heat-exchanges three types of fluids: an engine coolant, an engine oil, and a transmission oil (hereinafter, referred to as a T/M oil with one another). As shown in FIG. 1, the heat exchanger 1 is a plate-stack type heat exchanger configured by stacking plural plates 10 made of metal, such as aluminum, and integrally joining these plates. An example of a vehicle in which the heat exchanger 1 is installed may include an AT vehicle, a CVT vehicle, and an HV vehicle (the same in a "vehicle" referred to in the following description). FIG. 1 mainly shows respective flow passages of fluids heat-exchanged in the heat exchanger 1, and configurations other than those of these flow passages are appropriately omitted or simplified.

An outline of each flow passage will be described. In the heat exchanger 1, as shown in FIG. 1, plural plates 10 are stacked so as to form three types of flow passages: a first flow passage 11, a second flow passage 12, and a third flow passage 13 each of which is defined between each two adjacent plates 10.

Each "flow passage" denotes a space partitioned by the plates 10. In FIG. 1, a region corresponding to each first flow passage 11 is indicated by using no hatching, a region corresponding to each second flow passage 12 is indicated by using a dark dot hatching, and a region corresponding to the third flow passage 13 is indicated by using a light dot hatching, respectively. Each alternate long and short dash line arrow indicates a flow direction F11 of the engine coolant in each first flow passage 11. Each solid line arrow indicates a flow direction F12 of the engine oil in each second flow passage 12. Each broken line arrow indicates a flow direction F13 of the T/M oil in each third flow passage 13. The "flow direction" denotes a direction flowing from an inflow port of each flow passage toward an outflow port thereof (see FIG. 4 and FIG. 5).

The first flow passage 11, the second flow passage 12, and the third flow passage 13 are isolated and partitioned from one another by the plates 10, thereby preventing the fluids flowing through the respective flow passages from being mixed to one another. The heat exchanger 1 is configured by five layers in total, as shown in FIG. 1, and the second flow passage 12 and the third flow passage 13 are adjacently arranged in each of the first, the third, and the fifth layers from the top, and the first flow passage 11 is arranged in each of the second and the fourth layers from the top, respectively. The heat exchanger 1 is configured such that the same type of the flow passages communicate with one another thereinside so that the same type of the fluids can flow in the stacking direction of the plates 10. The specific configuration of the plates 10 for embodying the above described flow passages will be described later. First, each flow passage will be described, hereinafter.

The first flow passages 11 are flow passages used for flowing the engine coolant therethrough. As shown in FIG. 1, the first flow passage 11 is formed across an entire surface of each layer if the heat exchanger 1 is viewed in a plan view in a direction orthogonal to the stacking direction of the plates 10, and formed by an area equivalent to the sum of an area of the second flow passage 12 and an area of the third flow passage 13. The "area" herein denotes an area in a direction orthogonal to the stacking direction of the plates (the same in the "area" referred to in the following description).

As shown in FIG. 1, the plate 10 configuring the uppermost part of the heat exchanger 1 is provided with a first inflow port 111 used for introducing the engine coolant from the outside (engine) into the first flow passages 11, and a first outflow port 112 used for discharging the engine coolant from the first flow passages 11 to the outside (engine). The engine coolant introduced from the first inflow port 111 into the first flow passage 11 flows downward in the stacking direction of the plates 10, and is split into each first flow passage 11 in each layer (the second and the fourth layers from the top in FIG. 1). The engine coolant flows through the first flow passage 11 in each layer, and thereafter, flows upward in the stacking direction of the plates 10 to be joined together, and flows out from the first outflow port 112 to the outside of the heat exchanger 1.

Although not-shown in the drawing herein, each of the plates 10 configuring the first flow passage 11 in each layer is provided with an inter-layer communicating passage formed in a manner as to extend through each first flow passage 11 for the purpose of allowing the engine oil to communicate between the second flow passages 12 arranged above and below each first flow passage 11. Similarly, each first flow passage 11 in each layer is provided with an inter-layer communicating passage formed in a manner as to extend through the first flow passage 11 in each layer for the purpose of allowing the T/M oil to communicate between the third flow passages 13 arranged above and below each first flow passage 11. These inter-layer communicating passages are respectively formed at positions indicated by solid lines orthogonal to the flow direction F11 of the engine coolant in each first flow passage 11 (passage through which the engine oil flows in the stacking direction), and at positions indicated by broken lines orthogonal to the flow direction F11 (passage through which the /IM oil flows in the stacking direction), as shown in FIG. 1, for example.

The second flow passages 12 are flow passages used for flowing the engine oil therethrough. As shown in FIG. 1, each second flow passage 12 is formed on one half surface of each layer if the heat exchanger 1 is viewed in a plan view in the direction orthogonal to the stacking direction of the plates 10, and each second flow passage 12 has a half area of each first flow passage 11, and is formed by an area equivalent to an area of each third flow passage 13.

As shown in FIG. 1, the plate 10 configuring the lowermost part of the heat exchanger 1 is provided with a second inflow port 121 used for introducing the engine oil from the outside (engine) into the second flow passage 12, and a second outflow port 122 used for discharging the engine oil from the second flow passage 12 to the outside (engine). The engine oil introduced from the second inflow port 121 into the second flow passage 12 flows upward in the stacking direction of the plates 10, and is split into each second flow passage 12 in each layer (the first, the third, and the fifth layers from the bottom in FIG. 1). The engine oil flows through the second flow passages 12 in the respective layers, and thereafter, flows downward in the stacking direction of the plates 10 to be joined together, and flows out from the second outflow port 122 to the outside of the heat exchanger 1.

Although not-shown in the drawing herein, each of the plates 10 configuring the second flow passage 12 in each layer is provided with an inter-layer communicating passage formed in a manner as to extend through each second flow passage 12 for the purpose of allowing the engine coolant to communicate between the first flow passages 11 arranged above and below the second flow passages 12. These inter-layer communicating passages are respectively formed at positions indicated by alternate long and short dash lines orthogonal to the flow direction F12 of the engine oil in each second flow passage 12 (passage through which the engine coolant flows in the stacking direction), as shown in FIG. 1, for example. As shown in FIG. 1, the first outflow port 112 is formed in the uppermost plate 10 that partitions the second flow passage 12, but it is configured to prevent the engine coolant from intruding into the second flow passage 12 by providing the inter-layer passage.

The third flow passages 13 are flow passages used for flowing the T/M oil therethrough. As shown in FIG. 1, each third flow passage 13 is formed on the other half surface of each layer if the heat exchanger 1 is viewed in a plan view in the direction orthogonal to the stacking direction of the plates 10, and each third flow passage 13 has a half area of each first flow passage 11, and is formed to have an area equivalent to an area of each second flow passage 12.

As shown in FIG. 1, the plate 10 configuring the uppermost part of the heat exchanger 1 is provided with a third inflow port 131 used for introducing the T/M oil from the outside (transmission) into the third flow passage 13, and a third outflow port 132 used for discharging the T/M oil from the third flow passage 13 to the outside (transmission). The T/M oil introduced from the third inflow port 131 into the third flow passage 13 flows downward in the stacking direction of the plates 10, and is split into each third flow passage 13 in each layer (the first, the third, and the fifth layers from the top in FIG. 1). The T/M oil flows through the third flow passages 13 in the respective layers, and thereafter, flows upward in the stacking direction of the plates 10 to be joined together, and flows out from the third outflow port 132 to the outside of the heat exchanger 1.

Although not-shown in the drawing herein, each of the plates 10 configuring the third flow passage 13 in each layer is provided with an inter-layer communicating passage formed in a manner as to extend through the third flow passage 13 for the purpose of allowing the engine coolant to communicate between the first flow passages 11 arranged above and below each third flow passage 13. This inter-layer communicating passages are respectively formed at positions indicated by alternate long and short dash lines orthogonal to the flow direction F13 of the T/M oil in each third flow passage 13 (passage through which the engine coolant flows in the stacking direction), as shown in FIG. 1, for example. As shown in FIG. 1, the first inflow port 111 is formed in the uppermost plate 10 that partitions the third flow passage 13, but it is configured to prevent the engine coolant from intruding into the third flow passage 13 by providing the inter-layer passage.

The arrangement of each flow passage will be described, hereinafter. As shown in FIG. 1, each first flow passage 11 is disposed alone in a single layer, which is different from the layer where each second flow passage 12 and each third flow passage 13 are disposed. Each second flow passage 12 and each third flow passage 13 are adjacently disposed in the same single layer. Each layer in which the first flow passage 11 is disposed alone (the second and the fourth layers from the top in FIG. 1), and each layer in which the second flow passage 12 and the third flow passage 13 are adjacently disposed (the first, the third, and the fifth layers from the top in FIG. 1) are alternately arranged in the stacking direction of the plates 10. Accordingly, the engine coolant in each first flow passage 11 can mutually be heat-exchanged with both the engine oil in each second flow passage 12 and the T/M oil in each third flow passage 13 via the plates 10. Specifically, the engine coolant, the engine oil, and the T/M oil are configured to flow independently while being partitioned from one another by the plates 10. Each second flow passage 12 and each third flow passage 13 that are adjacent to each other in the same layer are isolated from each other by the plate 10; therefore, no heat exchange is carried out between the engine oil and the T/M oil.

In the heat exchanger 1, as shown in FIG. 1, each third flow passage 13 is disposed on an upstream side in the flow direction F11 of the engine coolant in each first flow passage 11, and each second flow passage 12 is disposed on a downstream side in the flow direction F11 of the engine coolant in each first flow passage 11. Hence, the engine coolant flowing through each first flow passage 11 is first heat-exchanged with the T/M oil flowing through each third flow passage 13 through the plates 10, and thereafter, is heat-exchanged with the engine oil flowing through each second flow passage 12 via the plate 10.

Figure 4:
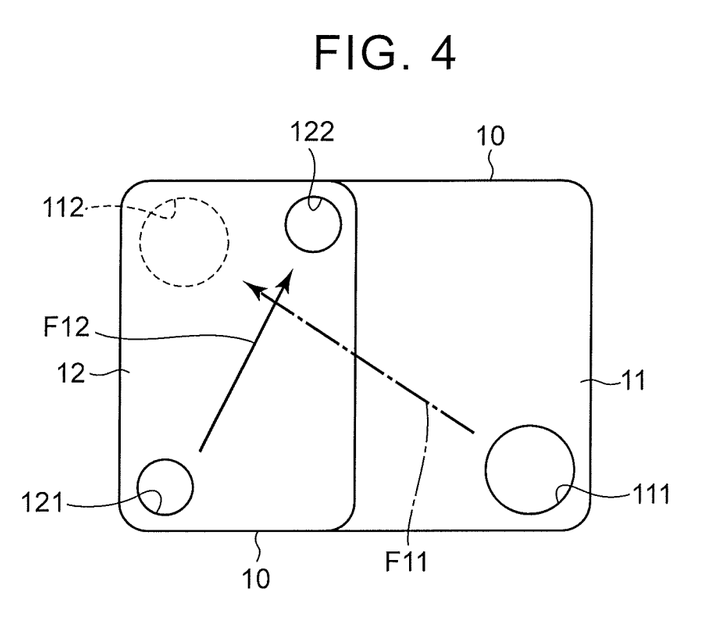
FIG. 4 is a drawing schematically illustrating a flow direction of the engine coolant in each first flow passage, and a flow direction of the engine oil in each second flow passage in the heat exchanger according to the first embodiment.
Figure 5:
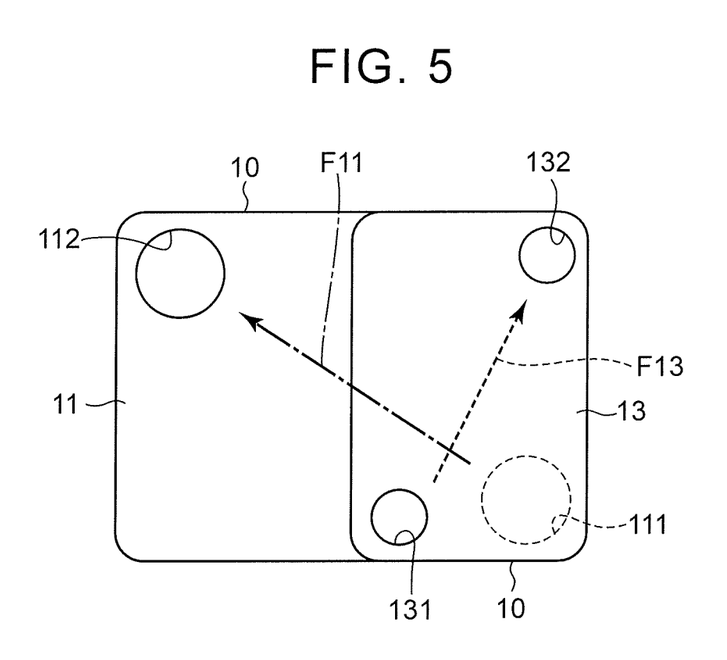
FIG. 5 is a drawing schematically illustrating the flow direction of the engine coolant in each first flow passage, and a flow direction of the transmission oil in each third flow passage in the heat exchanger according to the first embodiment.

The "upstream side in the flow direction F11 of the engine coolant" denotes a side where the engine coolant flows in, and more specifically, denotes the first inflow port 111 side from which the engine coolant flows in (see FIG. 4 and FIG. 5 for more details). The "downstream side in the flow direction F11 of the engine coolant" denotes a side where the engine coolant flows out, and more specifically, denotes the first outflow port 112 side from which the engine coolant flows out (see FIG. 4 and FIG. 5 for more details).

Figure 2:
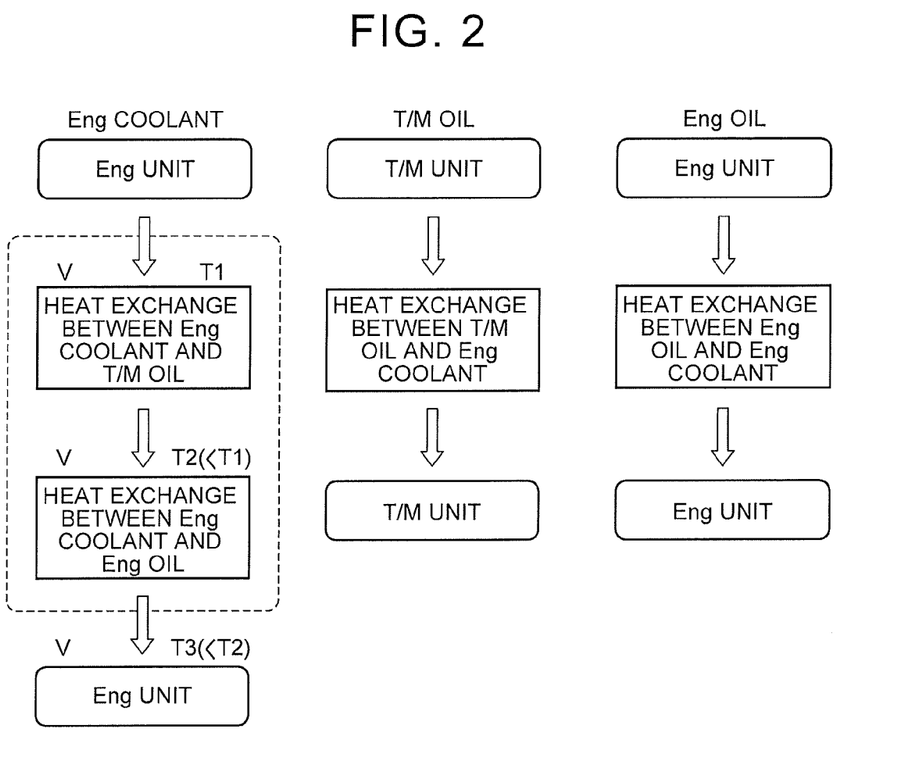
FIG. 2 is a drawing illustrating each step of heat exchange among an engine coolant, a transmission oil, and an engine oil in the heat exchanger according to the first embodiment.

The steps of the heat exchange of each fluid in the corresponding flow passage of the heat exchanger 1 is collectively illustrated in FIG. 2. Hereinafter, an example of increasing the temperature of the T/M oil through the heat exchange with the engine coolant will be described hereinafter. As shown in FIG. 2, the engine coolant flown from an Eng unit into each first flow passage 11 is first heat-exchanged with the T/M oil so as to increase the temperature of the T/M oil (the engine coolant is cooled (temperature thereof is decreased)). Subsequently, the engine coolant is heat-exchanged with the engine oil so as to increase the temperature of the engine oil (the engine coolant is cooled), and thereafter, the engine coolant is returned into the Eng unit. In this case, a flow rate V of the engine coolant before and after the heat exchange is constant, and the temperature of the engine coolant before and after the heat exchange is gradually decreased in order of a "coolant temperature before the heat exchange T1", a "coolant temperature after the heat exchange with the T/M oil T2", and a "coolant temperature after the heat exchange with the engine oil T3". Each amount of heat exchange between the engine coolant and the other fluids gradually increases toward the upstream in the flow direction F11 of the engine coolant. Hence, the amount of heat exchange between the engine coolant and the T/M oil becomes greater than the amount of heat exchange between the engine coolant and the engine oil.

As shown in FIG. 2, the T/M oil flown from a T/M unit into each third flow passage 13 is heat-exchanged with the engine coolant, thereby cooling the engine coolant (increasing the temperature of the T/M oil), and is then returned into the T/M unit. As shown in FIG. 2, the engine oil flown from the Eng unit into each second flow passage 12 is heat-exchanged with the engine coolant, thereby cooling the engine coolant (increasing the temperature of the engine oil), and is then returned into the Eng unit.

Figure 3:
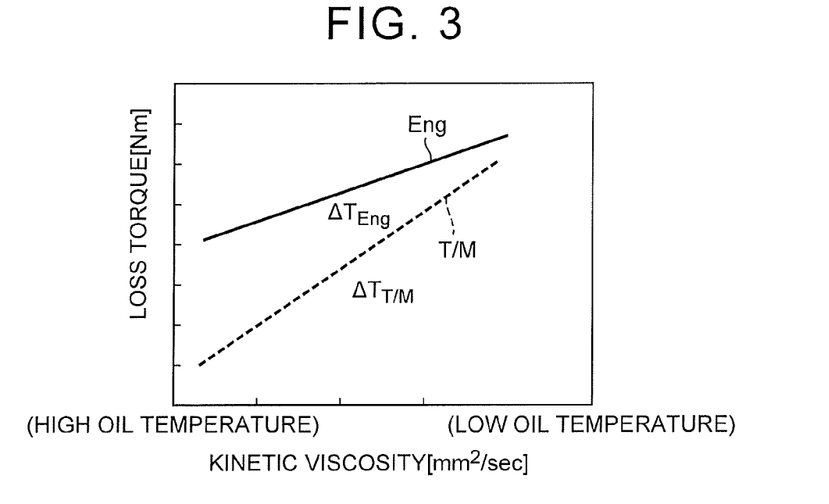
FIG. 3 is a graph showing a relation between respective loss torques of an engine and a transmission and respective kinetic viscosities of the engine oil and the transmission oil in a vehicle.

As aforementioned, the degree of variation in loss relative to variation in oil temperature is different between the engine oil and the T/M oil. For example, FIG. 3 shows relations between the loss torque and the oil temperature in the vehicle, and a vertical axis represents a loss torque, a horizontal axis represents a kinetic viscosity, a solid line represents a relation between a kinetic viscosity and a loss torque of the engine oil, and a broken line represents a relation between a kinetic viscosity and a loss torque of the T/M oil. In this drawing, $\Delta T_{Eng}$ represents an inclination of the loss torque of the engine relative to the variation in kinetic viscosity, and $\Delta T_{T/M}$ represents an inclination of the loss torque of the transmission relative to the variation in kinetic viscosity.

In FIG. 3, although the horizontal axis does not represent the oil temperature but represents the kinetic viscosity, the kinetic viscosity has a temperature-dependency; therefore, this drawing may be deemed to show the variation in loss relative to the variation in oil temperature. "High oil temperature" and "low oil temperature" indicated on the right and the left of the horizontal axis in this drawing represent that the kinetic viscosity is reduced as the oil temperature increases, and the kinetic viscosity increases as the oil temperature is reduced.

As shown in FIG. 3, in both the engine and the transmission, as the kinetic viscosity decreases (the oil temperature increases), the loss torque is decreased. Meanwhile, the inclination of the loss torque relative to the variation in oil temperature has a relation of $\Delta T_{T/M} > \Delta T_{Eng}$, and thus the inclination of the loss torque of the transmission is steeper than the inclination of the loss torque of the engine. Consequently, for example, it is possible to reduce more loss torque of the entire power train by increasing the oil temperature of the T/M oil by 1° C. rather than increasing the oil temperature of the engine oil by 1° C., for example, thus improving fuel efficiency.

In the heat exchanger 1, the heat exchange among the engine coolant, the engine oil, and the T/M oil is not carried out in parallel, but as shown in FIG. 1, each third flow passage 13 is disposed on the upstream side in the flow direction F11 of the engine coolant in each first flow passage 11, and each second flow passage 12 is disposed on the downstream side in the flow direction F11 of the engine coolant in each first flow passage 11. This configuration brings the engine coolant and the T/M oil to be preferentially heat-exchanged with each other.

In this manner, the heat exchanger 1 can preferentially heat-exchange the T/M oil having a greater variation in loss relative to the variation in oil temperature with the other fluids (the engine coolant and the engine oil) by first heat-exchanging the engine coolant with the T/M oil, and thereafter heat-exchanging the engine coolant with the engine oil. Accordingly, for example, in the transmission during warming-up, it is possible to rapidly increase the temperature of the T/M oil, thus reducing the loss of the transmission, and enhancing the fuel efficiency of the entire power train.

The flow direction of each fluid in the corresponding flow passage will be described with reference to FIG. 4 and FIG. 5, hereinafter. For example, in the heat exchanger 1 as shown in FIG. 1, FIG. 4 excerpts and illustrates only the first flow passage 11 and the second flow passage 12 adjacent to each other in the stacking direction of the plates 10. For example, in the heat exchanger 1 as shown in FIG. 1, FIG. 5 excerpts and illustrates only the first flow passage 11 and the third flow passage 13 adjacent to each other in the stacking direction of the plates 10.

In each of FIG. 4 and FIG. 5, an alternating long and short dash line arrow indicates a main line (typical flow direction) of the flow direction F11 of the engine coolant in the case of connecting the first inflow port 111 and the first outflow port 112 with a minimum distance. A solid line arrow indicates a main line of the flow direction F12 of the engine oil in the case of connecting the second inflow port 121 and the second outflow port 122 with a minimum distance. A broken line arrow indicates a main line of the flow direction F13 of the T/M oil in the case of connecting the third inflow port 131 and the third outflow port 132 with a minimum distance.

As shown in FIG. 4, in the heat exchanger 1, the first inflow port 111 and the first outflow port 112, and the second inflow port 121 and the second outflow port 122 are respectively formed in such a manner that the flow direction F11 of the engine coolant in each first flow passage 11 and the flow direction F12 of the engine oil in each second flow passage 12 are both in counter-flow relative to each other.

As shown in this drawing, the "counter-flow" denotes a state in which main lines of respective flow directions of different fluids intersect each other, or in which main lines of respective flow directions of different fluids oppose each other. Flows in a state out of counter-flow, that is, in a state in which main lines of respective flow directions of different fluids do not intersect each other, and in a state in which the main lines of the respective flow directions of the different fluids do not oppose each other are called as "co-flow".

Whether or not the flow direction F11 of the engine coolant in each first flow passage 11 and the flow direction F12 of the engine oil in each second flow passage 12 come into a counter-flow state depends on the positional relation among the first inflow port 111, the first outflow port 112, the second inflow port 121, and the second outflow port 122.

As shown in FIG. 4, the first inflow port 111 and the first outflow port 112 are formed at respective diagonal positions of corners when the plate 10 configuring the first flow passage 11 is viewed in a plan view. The second inflow port 121 and the second outflow port 122 are formed at respective diagonal positions of corners when the plate 10 configuring the second flow passage 12 is viewed in a plan view, and the main line of the flow direction F12 of the engine oil is formed at a position intersecting the main line of the flow direction F11 of the engine coolant as viewed in a plan view. For example, in each plate 10 in a rectangular shape as shown in FIG. 4, if the first inflow port 111 and the first outflow port 112 are formed at any diagonal positions of the four corners of the plate 10, the second inflow port 121 and the second outflow port 122 are formed at diagonal positions of the four corners that are not overlaid with the first inflow port 111 and the first outflow port 112 as viewed in the plan view.

In this manner, in the heat exchanger 1, the main line of the flow direction F11 of the engine coolant intersects the mail line of the flow direction F12 of the engine oil so that the flow direction of the engine coolant and the flow direction of the engine oil are both in counter-flow relative to each other; therefore, it is possible to maintain the difference in temperature among the fluids partitioned by the plates 10 to be greater compared with the case of the co-flow, thus efficiently heat-exchanging the engine coolant with the engine oil.

For example, if the flow directions of the respective fluids are in co-flow, the difference in temperature between these fluids increases on each inlet side (each inflow port side) of the fluids, but the difference in temperature between these fluids gradually decreases toward each outlet side (each out flow port side) of the fluids; thus the heat exchange efficiency is reduced as a whole. To the contrary, if the flow directions of the respective fluids are in counter-flow relative to each other, as the same in the embodiment, the difference in temperature between these fluids becomes constant on each inlet side (each inflow port side) of the fluids and on each outlet side (each outflow port side) of the fluids; thus it is possible to maintain the difference in temperature between these fluids to be higher on an average, thereby increasing the heat exchange efficiency as a whole.

As shown in FIG. 5, in the heat exchanger 1, the first inflow port 111 and the first outflow port 112, and the third inflow port 131 and the third outflow port 132 are respectively formed such that the flow direction F11 of the engine coolant in each first flow passage 11 comes into counter-flow relative to the flow direction F13 of the T/M oil in each third flow passage 13.

Whether or not the flow direction F11 of the engine coolant in each first flow passage 11 and the flow direction F13 of the T/M oil in each third flow passage 13 enter into a counter-flow state depends on the positional relation among the first inflow port 111, the first outflow port 112, the third inflow port 131, and the third outflow port 132.

As shown in FIG. 5, the first inflow port 111 and the first outflow port 112 are formed at diagonal positions of the corners if the plate 10 configuring the first flow passage 11 is viewed in a plan view. The third inflow port 131 and the third outflow port 132 are formed at respective diagonal positions of the corners if the plate 10 configuring the third flow passage 13 is viewed in a plan view, and the main line of the flow direction F13 of the T/M oil is formed at a position intersecting the main line of the flow direction F11 of the engine coolant. For example, in each plate 10 in a rectangular shape as shown in FIG. 5, if the first inflow port 111 and the first outflow port 112 are formed at any diagonal positions of the four corners of the plate 10, the third inflow port 131 and the third outflow port 132 are formed at diagonal positions of the four corners that are not overlaid with the first inflow port 111 and the first outflow port 112 as viewed in the plan view.

In this manner, in the heat exchanger 1, the main line of the flow direction F11 of the engine coolant intersects the mail line of the flow direction F13 of the T/M oil so that the flow direction of the engine coolant and the flow direction of the T/M oil are both in counter-flow relative to each other; therefore, it is possible to maintain the difference in temperature between the fluids partitioned by the plates 10 to be greater compared with the case of the co-flow, thus efficiently heat-exchanging the engine coolant with the T/M oil.

An example of a specific configuration of the heat exchanger 1 will be described, hereinafter. The specific configuration in the heat exchanger 1, that is, the shape and the stacking method of the plates 10 are not limited to specific ones, and the shape and the stacking method of the plates 10 may be appropriately defined so as to provide the aforementioned arrangements of the respective flow passages; and an example thereof may include the case of utilizing dish-shaped plates.

In this case, the following three types of plates may be used as the plates 10: large dish-shaped plates that partition the respective first flow passages 11, small dish-shaped plates that partition the respective second flow passages 12 and the respective third flow passages 13, and a flat plate that functions as an uppermost cover member, and these plates are combined (stacked) to form the respective flow passages. The "disk-shape" herein denotes a shape in which a flat surface is formed to be concave, an aperture is formed above the concave portion, and there are a bottom surface and a side surface. An adhesive agent is applied between the plates 10, and these plates 10 are subjected to heat treatment or the like so as to be integrally bonded into the heat exchanger 1.

In the heat exchanger 1 having the aforementioned configuration, the respective flow passages are arranged in consideration of the variation in loss relative to each variation in oil temperature of the engine oil and the T/M oil, thereby optimizing the respective amounts of heat exchange of the engine coolant, the engine oil, and the T/M oil;

therefore, it is possible to reduce loss of the engine and the transmission, and enhance the fuel efficiency of the entire power train.

In the vehicle heat exchanger as proposed in JP 2013-113578 A, each flow passage through which the engine oil flows, each flow passage through which the engine coolant flows, and each flow passage through which the T/M oil flows are stacked in this order; thus at least three layers are required to carry out the heat exchange among the three types of fluids. To the contrary, in the heat exchanger 1 according to the present embodiment, each second flow passage 12 through which the engine oil flows and each third flow passage 13 through which the T/M oil flows are arranged in the same layer; and thus it is possible to carry out the heat exchange among three types of fluids in two layers. Accordingly, compared with the vehicle heat exchanger as disclosed in JP 2013-113578 A, in the heat exchanger 1, it is possible to reduce the number of the plates 10 used for forming the flow passages of the respective fluids. Hence, according to the present embodiment, it is possible to reduce the number of layers as well as the dimension of the heat exchanger 1.

In the vehicle heat exchanger as proposed in JP 2013-113578 A, since the heat exchange is simultaneously carried out among the engine coolant, the engine oil, and the T/M oil, the respective amounts of heat exchange of these fluids might be decreased, which results in deterioration of the fuel efficiency. Specifically, since the fluids flow in the respective layers in parallel, the flow rate of each fluid in each layer decreases, and thus the amount of heat exchange of each fluid is reduced. In particular, the T/M oil has a smaller flow rate than those of the engine coolant and the engine oil; therefore, in the vehicle heat exchanger as described in JP 2013-113578 A, it might be impossible to satisfy the required amount of heat exchange. If the flow passages are designed to satisfy the amount of heat exchange required in the T/M oil having the smallest flow rate, in the case of the conventional vehicle heat exchanger, the respective flow passages through which the other fluids than the T/M oil flow necessarily become larger in accordance with the increased dimension of the flow passage through which the T/M oil flows, which results in an increase in dimension of the entire vehicle heat exchanger. To the contrary, the heat exchanger 1 of the present embodiment is configured such that the respective flow passages are so arranged as to satisfy the amount of heat exchange required in the T/M oil; therefore, it is possible to suppress the increase in dimension of the entire heat exchanger.

In the vehicle heat exchanger as described in JP 2013-113578 A, it is impossible to arrange the flow directions of all the fluids to be in counter-flow relative to one another, so that some of the fluids are in co-flow. To the contrary, in the heat exchanger 1 of the present embodiment, as shown in FIG. 1, each third flow passage 13 is arranged on an upstream side in the flow direction F11 of the engine coolant in each first flow passage 11, and each second flow passage 12 is arranged on a downstream side in the flow direction F11 of the engine coolant in each first flow passage 11, thereby arranging the flow directions of the all fluids to be in counter-flow relative to one another. Accordingly, in the heat exchanger 1 of the present embodiment, the respective fluids can be more efficiently heat-exchanged with one another, compared with the vehicle heat exchanger as described in JP 2013-113578 A in which some of the flow passages are arranged in co-flow.

In the vehicle heat exchanger as proposed in JP 2013-113578 A, the number of the plates configuring each flow passage is the same; thus it is impossible to set the amount of heat exchange of each fluid to be an optimum value, which causes a deficiency and excess heat exchange. To the contrary, the heat exchanger 1 of the present embodiment can set the amount of heat exchange of each fluid to be an optimum value by appropriately arranging the location of each flow passage.

Figure 6A:
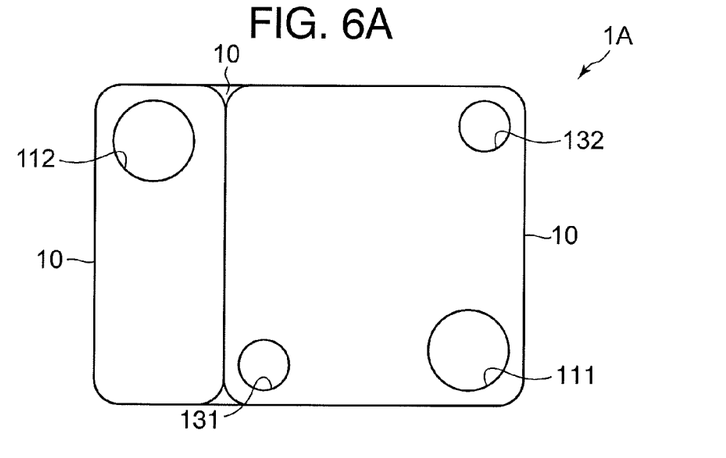
FIGS. 6A, 6B, and 6C are schematic drawings illustrating a configuration of a heat exchanger according to a second embodiment, and showing a plan view (FIG. 6A), a front view (FIG. 6B), and a bottom view (FIG. 6C) thereof in order from the top.
Figure 6B:
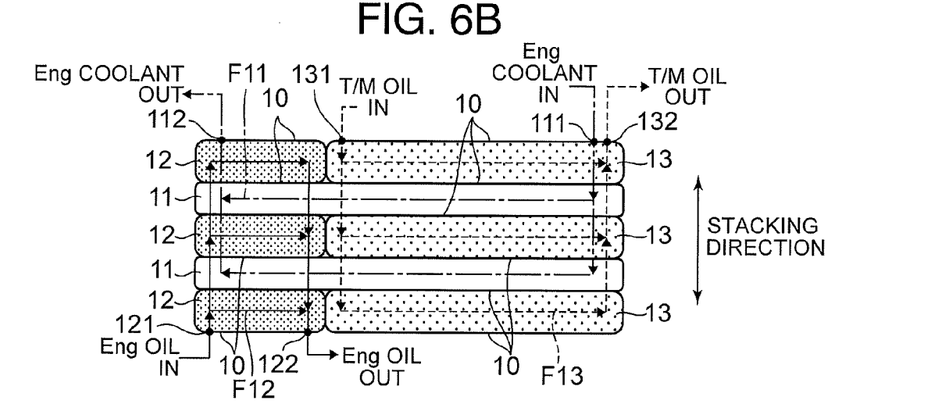
Figure 6C:
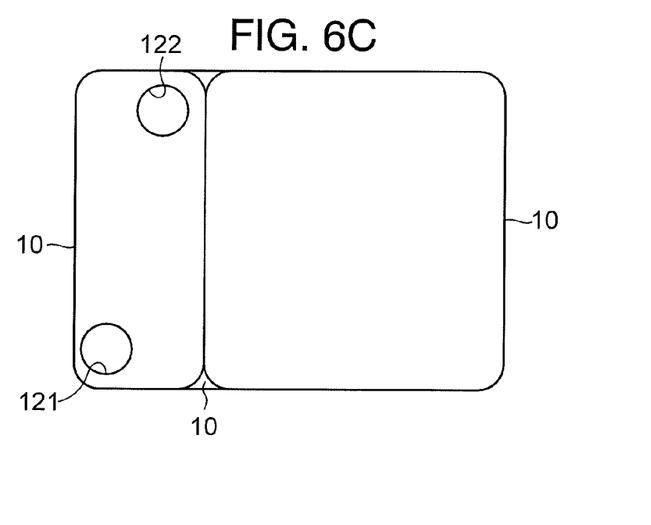

The second embodiment will be described hereinafter. In the heat exchanger 1 of the first embodiment, as shown in FIG. 1, each second flow passage 12 and each third flow passage 13 both have the same area, but both the areas may be different from each other in accordance with the amount of heat exchange required in each fluid. Specifically, in a heat exchanger 1A according to the second embodiment, as shown in FIG. 6, an area of each third flow passage 13 is formed to be greater than an area of each second flow passage 12. The area referred to herein denotes an area in a direction orthogonal to the stacking direction of each plate 10 as aforementioned. Hereinafter, as shown in FIGS. 6A, 6B, and 6C the reason for changing an area ratio of each flow passage will be described with reference to FIG. 7 and FIG. 8 hereinafter. The heat exchanger 1A has the same configurations as those of the heat exchanger 1 of the first embodiment other than the configuration of the area of each second flow passage 12 and the area of each third flow passage 13, both illustrated in FIG. 6B.

Figure 7:
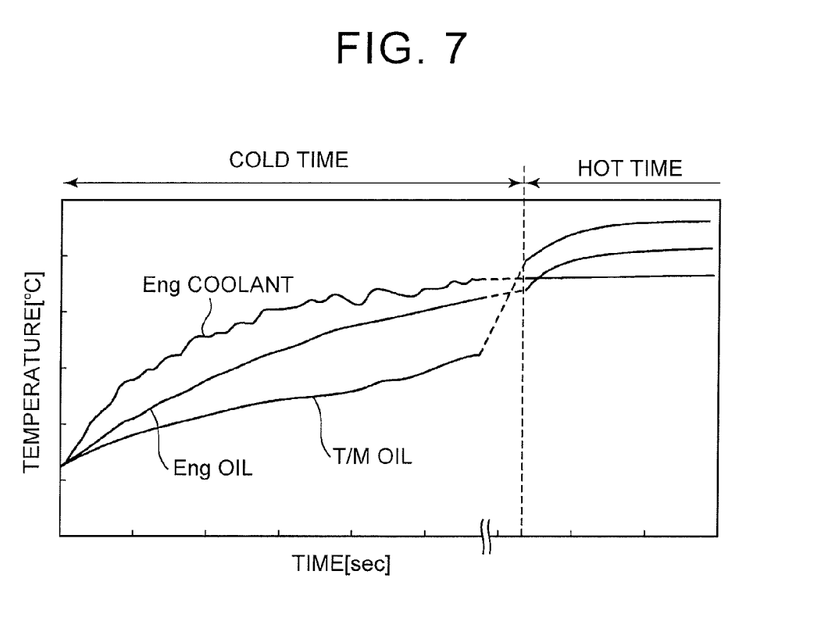
FIG. 7 is a graph showing each temperature transition of the respective fluids during a cold time indicating a state before the completion of warming-up (during warming-up) of the engine and the transmission in the vehicle, and during a hot time indicating a state after the completion of the warming-up of the engine and the transmission in the vehicle.

FIG. 7 shows each temperature transition of the respective fluids during a cold time indicating a state before the completion of the warming-up (during the warming-up) of the engine and the transmission in the vehicle and during a hot time indicating a state after the completion of the warming-up of the engine and the transmission in the vehicle. In FIG. 7, a broken line indicates a time point when the warming-up is completed. As shown in this drawing, before the completion of the warming-up, the oil temperature of the T/M oil is reduced lower than the oil temperature of the engine oil. Hence, before the completion of the warming-up, it is necessary to increase the oil temperature of the T/M oil in preference to the oil temperature of the engine oil so as to increase the amount of heat exchange between the engine coolant and the T/M oil.

Figure 8:
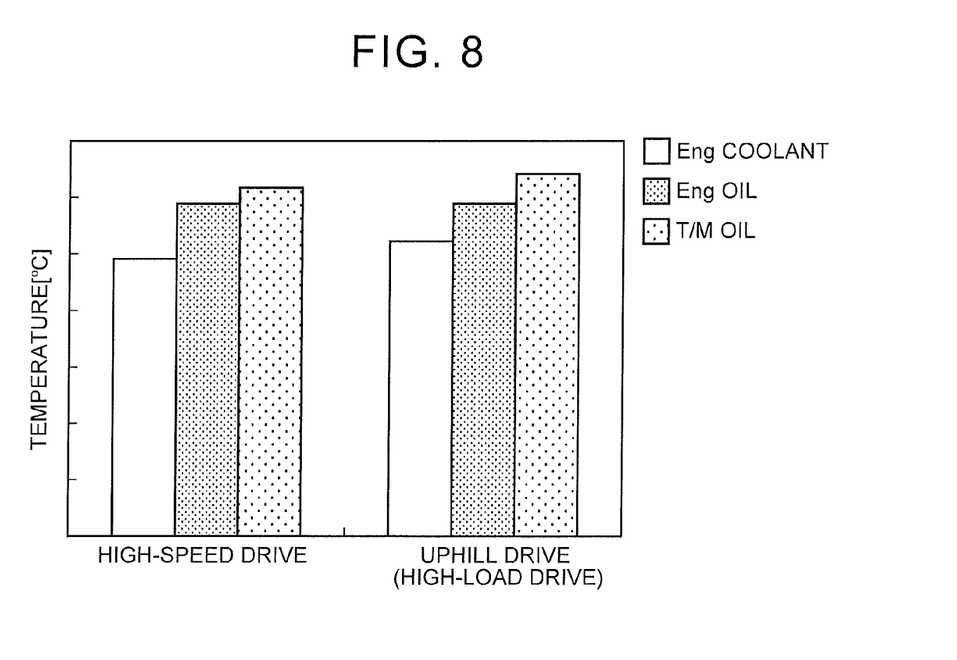
FIG. 8 is a graph showing each maximum temperature of the respective fluids during high-speed drive and uphill (high-load) drive of the vehicle.

Meanwhile, FIG. 8 shows maximum temperatures of the respective fluids during high-speed drive and uphill drive of the vehicle. As shown in FIG. 8, during high-speed drive or high-load drive of the vehicle, such as uphill drive, the oil temperature of the T/M oil is increased higher than the oil temperature of the engine oil. Hence, during the high-speed drive or the high-load drive of the vehicle, the T/M oil is required to be cooled more than the engine oil; therefore, the amount of heat exchange between the engine coolant and the T/M oil is required to be increased. Specifically, during the high-speed drive and the uphill drive of the vehicle, it is necessary to increase a cooling performance (amount of heat exchange) with the engine coolant for the T/M oil rather than for the engine oil.

In the heat exchanger 1A, in comparison between the area of each second flow passage 12 and the area of each third flow passage 13, one of the engine oil and the T/M oil that has a lower oil temperature before the completion of the warming-up of the engine and the transmission in the vehicle, or that has a higher oil temperature during the high-speed drive or the high-load drive of the vehicle is configured to have a greater area of each flow passage thereof. Through this, of the engine oil and the T/M oil, the one that has a lower oil temperature before the completion of the warming-up, or that has a higher oil temperature during the high-speed drive or the high-load drive of the vehicle is configured to have an increased flow rate so as to increase the amount of heat exchange. As shown in FIG. 6, in the heat exchanger 1A, the area of each third flow passage 13 is larger than the area of each second flow passage 12, thereby increasing the flow rate of the T/M oil so as to increase the amount of heat exchange between the engine coolant and the T/M oil more than the amount of heat exchange between the engine coolant and the engine oil.

In this manner, in the heat exchanger 1A, the area ratio between each second flow passage 12 through which the engine oil flows and each third flow passage 13 through which the T/M oil flows is changed, thereby optimizing the amount of heat exchange between the engine coolant and the T/M oil without changing the entire dimension (width, height) of the heat exchanger 1A.

The third embodiment will be described hereinafter. In the heat exchanger 1, as shown in FIG. 1, the T/M oil introduced from the third inflow port 131 is split into the respective third flow passages 13 in the plural layers, and the T/M oil flows in the same direction in all the third flow passages 13 of the respective layers; but the third flow passages 13 may be formed in a meandering structure (multipath structure). Specifically, as shown in FIG. 9, the heat exchanger 1B according to the third embodiment is configured such that the flow direction F13 of the T/M oil in each third flow passage 13 meanders between each third flow passage 13 of each layer so as to bring the T/M oil in the third flow passages 13 of the respective layers to flow in a different direction from one another.

As aforementioned, in a three-phase heat exchanger, in general, the flow rate of the T/M oil is smaller than the flow rate of the engine coolant and the flow rate of the engine oil. In the case of the heat exchanger 1, the T/M oil introduced from the third inflow port 131 is split into the respective third flow passages 13 arranged in the plural layers, so that the flow rate of the T/M oil that is originally smaller is further divided. Hence, depending on the amount of the T/M oil introduced from the third inflow port 131, desired amount of heat exchange cannot be secured in some cases. As described in FIG. 7 and FIG. 8, in the three-phase heat exchanger, it has been demanded to increase an amount of heat exchange between the engine coolant and the T/M oil as much as possible.

Figure 9:
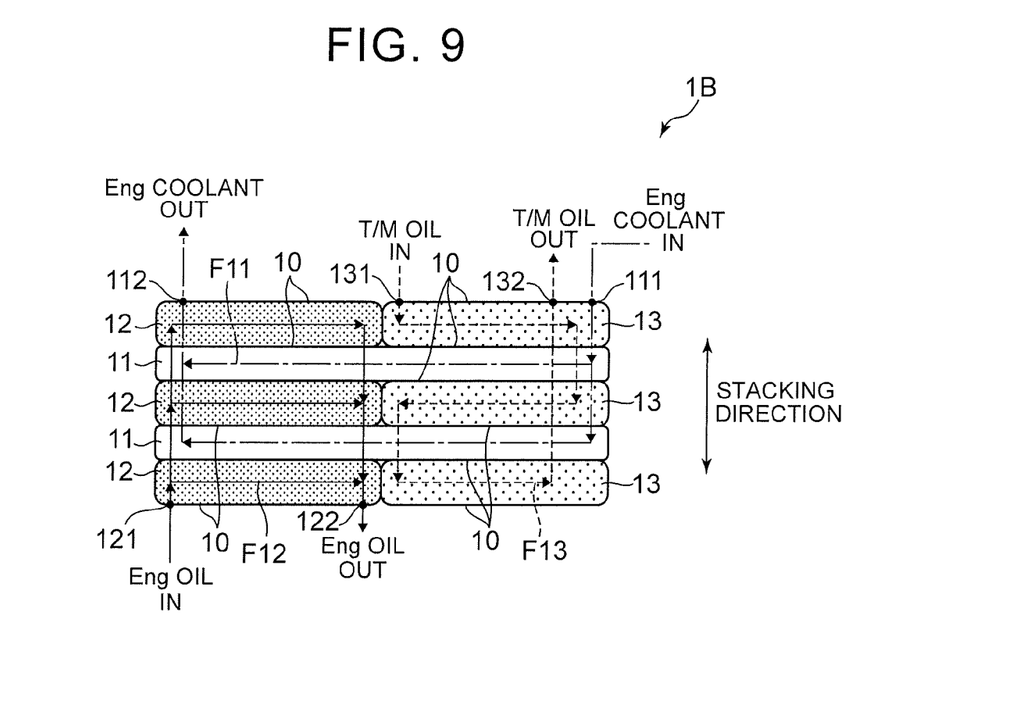
FIG. 9 is a schematic drawing schematically illustrating a configuration of a heat exchanger according to a third embodiment.

To cope with this, as shown in FIG. 9, in the heat exchanger 1B, the third flow passage 13 is configured in the meandering structure. Specifically, in the heat exchanger 1B, the T/M oil introduced from the third inflow port 131 that is formed in the plate 10 of the uppermost part flows through the third flow passage 13 of the first layer from the top as viewed in a plan view, in a direction from the third inflow port 131 to the third outflow port 132, flows through the not-shown inter-layer communicating passage formed in the first flow passage 11 of the second layer from the top into the third flow passage 13 of the third layer from the top. Subsequently, the T/M oil flows through the third flow passage 13 of the third layer from the top as viewed in a plan view, in a direction from the third outflow port 132 to the third inflow port 131, and then flows through the not-shown inter-layer passage formed in the first flow passage 11 of the fourth layer from the top into the third flow passage 13 of the fifth layer from the top. Subsequently, the T/M oil flows through the third flow passage 13 of the fifth layer from the top as viewed in a plan view, in a direction from the third inflow port 131 to the third outflow port 132, flows upward in the stacking direction of the plates 10, and flows out from the third outflow port 132 formed in the plate 10 of the uppermost part of the heat exchanger 1B.

As aforementioned, according to the heat exchanger 1B, the flow rate of the T/M oil introduced from the third inflow port 131 is not split, but flows through the third flow passages 13 in the respective layers from one layer to another layer. Accordingly, it is possible to increase the amount of heat exchange between the engine coolant and the T/M oil. It is possible to optimize the amount of heat exchange between the engine coolant and the T/M oil without changing the dimension (width, height) of the entire heat exchanger 1B.

A choice of the structure of the third flow passages 13 between the meandering structure of the heat exchanger 1B and the split structure of the heat exchanger 1 may be made depending on the supposed flow rate of the T/M oil. For example, if the flow rate of the T/M oil is not less than a predetermined flow rate, the third flow passages 13 may be formed in the split structure of the heat exchanger 1, and if the flow rate of the T/M oil is less than the predetermined flow rate, the third flow passages 13 may be formed in the meandering structure of the heat exchanger 1B.

Figure 10:
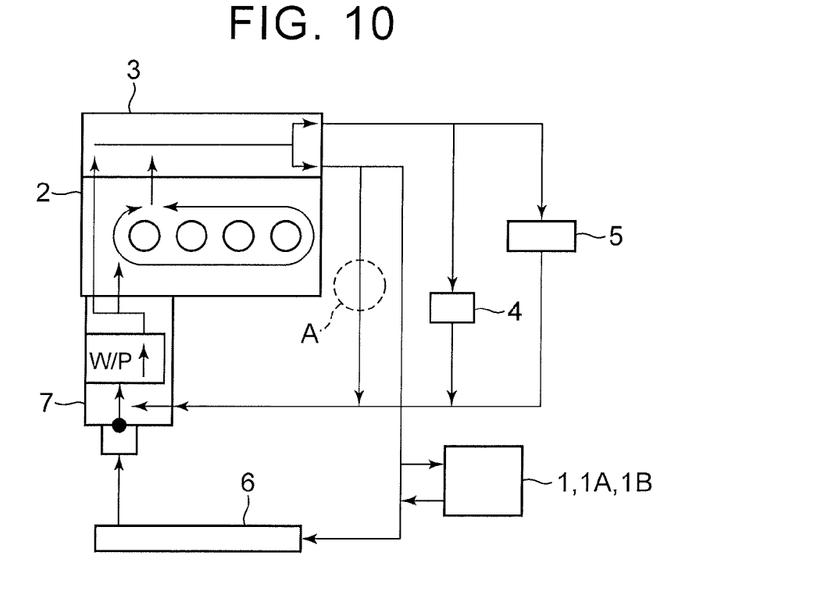
FIG. 10 is a drawing illustrating an example of an arrangement position of the heat exchanger according to each embodiment in a vehicle.

An arrangement position of the heat exchanger will be described. It is preferable to arrange each of the heat exchangers 1, 1A, 1B at a position at which the flow rate of the engine coolant is greater in the vehicle, and for example, as shown in FIG. 10, this may be disposed in a radiator passage. In this drawing, there are respectively illustrated a cylinder block 2, a cylinder head 3, a throttle body 4, a heater 5, a radiator 6, and a thermostat 7 of the engine in the vehicle. In FIG. 10, an arrow illustrated between each two adjacent component elements indicates a passage through which each fluid (the engine coolant, the engine oil, the T/M oil) flows. The "flow rate of the engine coolant is great" denotes the case of the engine coolant having an average flow rate of not less than 6 L/min, for example.

As shown in FIG. 10, the heat exchanger 1, 1A, 1B is disposed in the vicinity of an inlet of the radiator 6 so as to supply the heat exchanger 1, 1A, 1B with more engine coolant, thereby enhancing the amount of heat exchange of each fluid. In the case of disposing the heat exchanger 1, 1A, 1B at the position as shown in this drawing, the thermostat 7 is in a closed state before the completion of the engine warming-up, which means that the engine coolant is not sufficiently heated, and the heat exchanger 1, 1A, 1B is supplied with no engine coolant, thus carrying out no heat exchange among the respective fluids. On the other hand, after the completion of the engine warming-up, which means that the engine coolant is sufficiently heated, the thermostat 7 is opened so as to supply the heat exchanger 1, 1A, 1B with the engine coolant, thus carrying out the heat exchange among the respective fluids. Accordingly, if the heat exchanger 1, 1A, 1B is disposed at the position as shown in this drawing, it is possible to automatically carry out switching between execution and inexecution of the heat exchange among the respective fluids before and after the completion of the engine warming-up.

In general, before the completion of the engine warming-up, it is preferable to preferentially increase the temperature of the engine coolant in light of enhancement of the fuel efficiency; therefore, as shown in FIG. 10, the heat exchanger 1, 1A, 1B is disposed in the vicinity of the inlet of the radiator 6 so as to enhance the fuel efficiency.

The heat exchanger 1, 1A, 1B may be disposed at a position immediately after the cylinder head 3, other than the above position, as indicated by a reference numeral A of FIG. 10. The flow rate of the engine coolant also increases at this position; thus it is possible to enhance the amount of heat exchange of each fluid. In this case, the second inflow port 121 and the second outflow port 122 may be directly mounted to the cylinder head 3, for example.

As described above, the specific embodiments of the heat exchanger according to the present disclosure has been explained, but the disclosure is not limited to the above descriptions. Various changes and modifications may be made based on the description and be included within the scope of the invention.

For example, in FIG. 1 FIG. 6, FIG. 9 as described above, there has been explained the heat exchanger 1, 1A, 1B having five layers in total configured by alternately arranging, in the stacking direction of the plates 10, the layer including only the first flow passage 11, and the layer including the second flow passage 12 and the third flow passage 13 that are adjacently disposed. However, the number of layers of the heat exchanger 1, 1A, 1B may be more than five, or less than five as long as the layer including only the first flow passage 11 and the layer including the second flow passage 12 and the third flow passage 13 that are adjacently disposed are alternately arranged.

What is claimed is:

1. A heat exchanger for a vehicle, the vehicle including an engine and a transmission, the heat exchanger comprising:
    a first flow passage through which an engine coolant flows;
    a second flow passage through which an engine oil flows;
    a third flow passage through which a transmission oil flows; and
    plural plates that partition the first flow passage, the second flow passage, and the third flow passage,
    wherein
    the first flow passage is configured to allow the engine coolant to be heat-exchanged with both the engine oil in the second flow passage and the transmission oil in the third flow passage via the plates,
    the second flow passage is arranged in the same layer as a layer of the third flow passage,
    the first flow passage is arranged in a different layer from the layer of the second flow passage and the third flow passage,
    the third flow passage is disposed on an upstream side in a flow direction of the engine coolant in the first flow passage, and
    the second flow passage is disposed on a downstream side in the flow direction of the engine coolant in the first flow passage.

2. The heat exchanger for the vehicle according to claim 1, wherein
    the first flow passage includes a first inflow port of the engine coolant and a first outflow port of the engine coolant,
    the second flow passage includes a second inflow port of the engine oil and a second outflow port of the engine oil, and
    the first inflow port, the first outflow port, the second inflow port and the second outflow port are arranged in such a manner that a flow direction of the engine coolant in the first flow passage and a flow direction of the engine oil in the second flow passage are in counter-flow relative to each other.

3. The heat exchanger for the vehicle according to claim 1, wherein
    the first flow passage includes a first inflow port of the engine coolant and a first outflow port of the engine coolant,
    the third flow passage includes a third inflow port of the transmission oil and a third outflow port of the transmission oil, and
    the first inflow port, the first outflow port, the third inflow port and the third outflow port are arranged in such a manner that a flow direction of the engine coolant in the first flow passage and a flow direction of the transmission oil in the third flow passage are in counter-flow relative to each other.

4. The heat exchanger for the vehicle according to claim 1, wherein
    a third area of the third flow passage in the direction orthogonal to a stacking direction of the plates is greater than a second area of the second flow passage in a direction orthogonal to the stacking direction of the plates.

\* \* \* \* \*